(12) United States Patent
Miller et al.

(10) Patent No.: US 7,327,687 B2
(45) Date of Patent: Feb. 5, 2008

(54) WIRELESS NETWORK VIRTUAL STATION ADDRESS TRANSLATION WITH EXTERNAL DATA SOURCE

(75) Inventors: Douglas M. Miller, Santa Barbara, CA (US); Ken Balmy, Santa Barbara, CA (US); Jeff A Bechdol, Santa Barbara, CA (US)

(73) Assignee: IXIA, Calabasas, CA (US)

( * ) Notice: Subject to any disclaimer, the term of this patent is extended or adjusted under 35 U.S.C. 154(b) by 565 days.

(21) Appl. No.: 11/021,890

(22) Filed: Dec. 23, 2004

(65) Prior Publication Data

US 2006/0234636 A1    Oct. 19, 2006

Related U.S. Application Data

(60) Provisional application No. 60/533,723, filed on Dec. 30, 2003.

(51) Int. Cl.
*G01R 31/08* (2006.01)

(52) U.S. Cl. ............ 370/241; 370/338; 370/466; 703/23; 703/24; 455/67.11

(58) Field of Classification Search ............ None
See application file for complete search history.

(56) References Cited

U.S. PATENT DOCUMENTS

| | | | |
|---|---|---|---|
| 6,272,450 B1 | 8/2001 | Hill | |
| 6,601,020 B1 | 7/2003 | Myers | |
| 6,628,965 B1 * | 9/2003 | LaRosa et al. ............ 455/557 |
| 6,724,730 B1 | 4/2004 | Mlinarsky | |
| 2002/0138226 A1 | 9/2002 | Doane | |
| 2003/0009544 A1 | 1/2003 | Wach | |
| 2003/0139919 A1 | 7/2003 | Sher | |
| 2003/0202486 A1 | 10/2003 | Anton | |
| 2003/0236089 A1 | 12/2003 | Beyme | |
| 2005/0053008 A1 | 3/2005 | Griesing | |
| 2005/0141469 A1 * | 6/2005 | Miller et al. ............ 370/338 |
| 2006/0229018 A1 * | 10/2006 | Mlinarsky et al. ....... 455/67.11 |

OTHER PUBLICATIONS

U.S. Appl. No. 10/776,413, Mlinarsky.

* cited by examiner

*Primary Examiner*—Duc Ho
(74) *Attorney, Agent, or Firm*—SoCal IP Law Group LLP; Steven C. Sereboff; Mark Andrew Goldstein

(57) ABSTRACT

A method and system for the capture of data files transmitted over a wired network by a data traffic generator. The mapping and/or translation of network addressing data contained within the captured data frames is such that the frames, when transferred over the wireless medium, appear to have originated from one of a population of emulated wireless stations. The mapping and/or translation of network addressing data contained in data frames received over the wireless medium directed to a specific emulated wireless station is such that the frames, when transmitted over the wired network, appear to be destined for the data traffic generator. The mapping and/or translation function is applied as frames traverse the boundary between the external data source network interface and the wireless network interface.

10 Claims, 1 Drawing Sheet

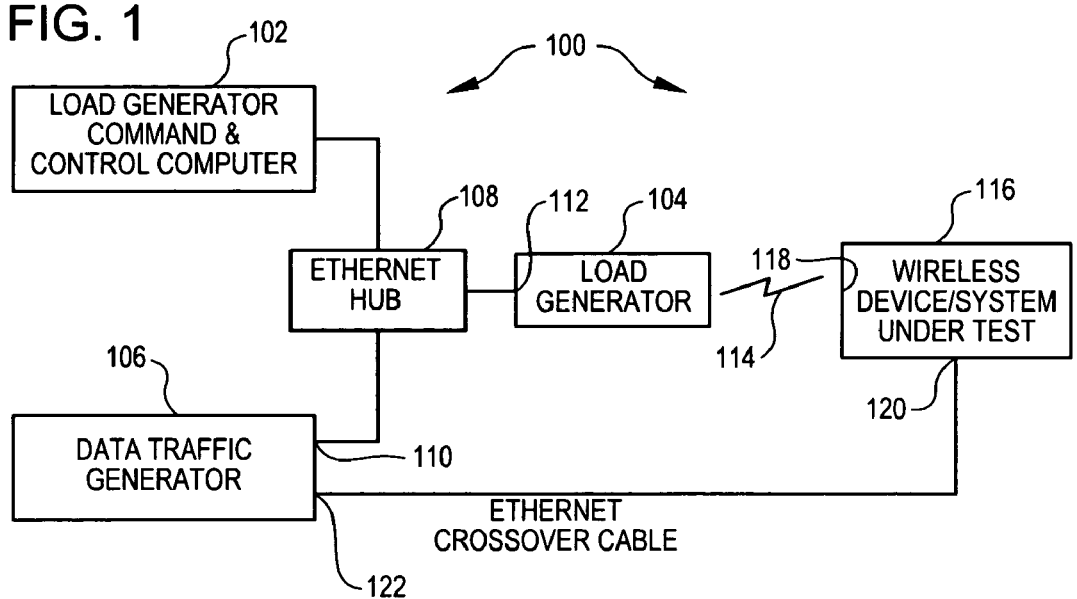
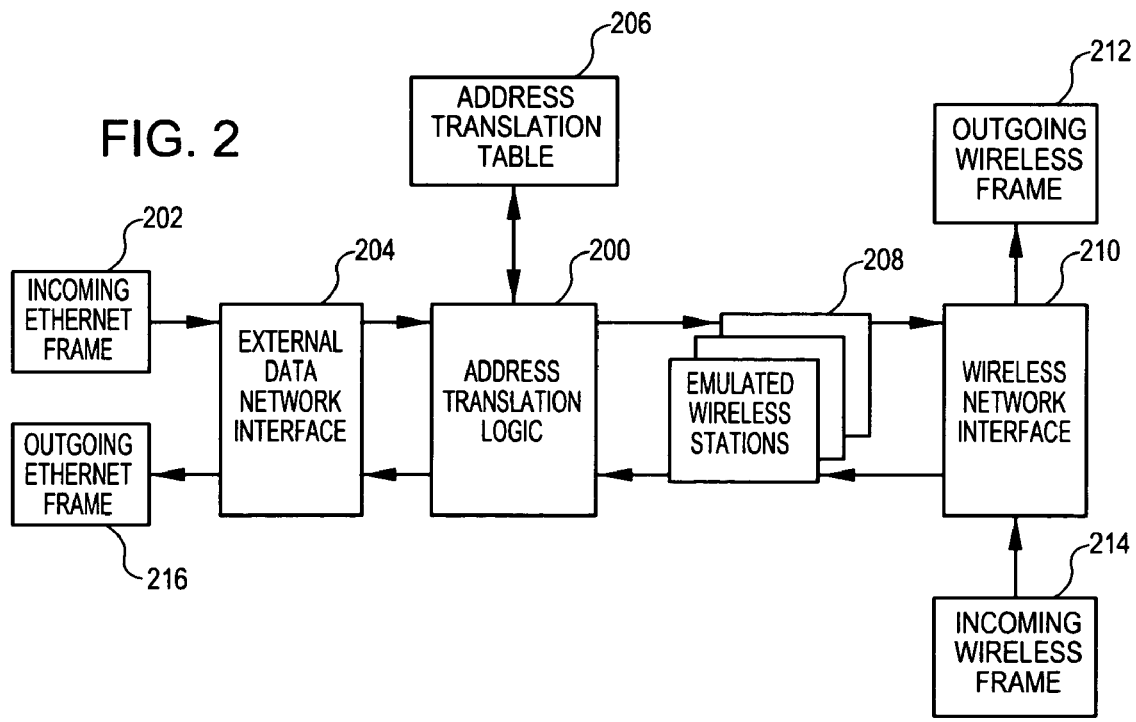

WIRELESS NETWORK VIRTUAL STATION ADDRESS TRANSLATION WITH EXTERNAL DATA SOURCE

CROSS REFERENCE TO A RELATED APPLICATION

This application is entitled to, and claims the benefit of, the 30 Dec. 2003 filing date of provisional application No. 60/533,723.

INCORPORATION BY REFERENCE

Copending application Ser. No. 10/424,161 filed 25 Apr. 2003 is, in its entirety, hereby incorporated in this application by reference.

TECHNICAL FIELD OF THE INVENTION

The present invention relates generally to the field of wireless data communications and, specifically, to the emulation of multiple stations in a wireless network.

BACKGROUND OF THE INVENTION

Local Area Networks (LANs) and their associated equipment (network interface cards, bridges, switches, routers, etc.) have existed for some time. Methods and equipment have been developed to test and measure LAN infrastructures, and many companies have invested large amounts of talent and money in building and marketing products for performing these operations and in the actual use of these testing and measuring products.

The common practice within the LAN test and measurement industry is to design test methods and equipment that will generate over one network interface a data stream containing frames that appear to be sourced from one or more different network nodes. This data stream traverses a network or device and is received on a second network interface attached to the test equipment. This topology allows the test methods and equipment to measure various network/device performance metrics.

Wireless Local Area Networks (WLANs) are new and present a challenge. How can one make the same level of methods and products available for LAN's available to perform adequate test and measurement operations related to WLAN devices and networks? The currently envisioned approach of redesigning current LAN test and measurement methods and equipment to work in the WLAN environment is a nontrivial exercise which requires a large investment of funds and talent.

SUMMARY OF THE INVENTION

The present invention overcomes the considerable expense of redesigning existing test methods and platforms to include the hardware and software required to support wireless networks. This is accomplished by providing a platform (i.e., the load generator) that: (a) connects to the LAN interface employed by current test equipment, (b) emulates a programmable number of wireless virtual stations, (c) executes for each wireless virtual station the wireless protocol procedures required to attain a state in which data transfer to and from the wireless system under test is enabled, (d) allows for the transparent capture of test data frames generated by the current test equipment, (e) maps individual frames based on OSI (Open Systems Interconnection) Layer 2 and/or Layer 3 addressing data to associated wireless virtual stations, and (f) transfers the frames to and from the wireless system/device under test.

Among the benefits of the present invention is its leveraging of a user's potentially considerable investment in test equipment for wired network installations so that the existing equipment can easily and readily also be used in testing a wireless network installation or a wireless extension to an existing wired network. The capabilities of the wired test apparatus are extended for use in wireless installations or with wireless devices by the present invention.

The important objects, features, and advantages of the present invention will be apparent to the reader from the foregoing and the appended claims and as the ensuing detailed description and discussion of the invention proceeds in conjunction with the accompanying drawings.

BRIEF DESCRIPTION OF THE DRAWINGS

FIG. 1 is a block diagram depicting a typical test setup, which embodies the principles of the present invention and employs a data traffic generator and a load generator device. The present invention comprises a component within a wireless load generator, which is positioned, and provides a wireless link, between an external data traffic generator and a wireless system/device under test; and FIG. 2 is a block diagram depicting address translation logic and logic flow within the load generator device. The address translation capability is accomplished primarily by address translation logic and an address translation table.

DETAILED DESCRIPTION OF THE INVENTION

FIG. 1 depicts a WLAN test and measuring system 100 embodying and set up in accord with the principles of the present invention. System 100 comprises a load generator command and control computer 102, a load generator 104 with an address translation logic block discussed in detail below, and a data traffic generator 106 attached to an Ethernet hub 108. Load generator 104 is configured and controlled with the load generator command and control computer 102.

A population of virtual wireless stations are emulated by the load generator 104. These emulated virtual stations are configured and controlled with control computer 102.

Load generator 104 establishes wireless communication sessions with the wireless system/device 116 under test by issuing appropriate request messages, conforming to the specification for the protocol under which the wireless network operates, to system device 116 over a wireless link 114 for each emulated wireless station. Once load generator 104 has established the wireless communication sessions, external data traffic generator 106 may initiate data streams directed at system/device 116 and start collecting metrics related to the performance of the system or device 116.

The data traffic generator 106 transmits Ethernet frames containing data over traffic generator interface 110 through Ethernet hub 108. Load generator 104 captures the frames arriving at its Ethernet interface 112. The frames are mapped/translated to corresponding wireless virtual station addresses and then transmitted over wireless link 114 to a wireless system/device 116 under test. Wireless data frames are received by the wireless system/device 116 under test over wireless interface 118 of the system or device 116 and in turn transmitted over Ethernet interface 120. Data traffic generator 106 receives the frames over an Ethernet interface 122 of the data traffic generator.

The external data traffic generator 106 may also transmit data through the network in the reverse direction. In this case, the data traffic generator 106 transmits data frames on its Ethernet interface 122. These frames are received by the system/device 116 under test on its Ethernet interface 120. The system/device 116 then transmits frames which are addressed to a wireless station over the wireless link 114. Frames received by the load generator 104 via the wireless link 114 undergo a reverse mapping/translation to the address of the destination node in the external traffic generator 106, and are transmitted on the load generator's Ethernet interface 112. The readdressed frame then traverses the Ethernet hub 108 and arrives at the data traffic generator 104 via its Ethernet interface 110.

From the perspective of the load generator 104, frame flow may be bidirectional in that frames may originate from either or both Ethernet interfaces, 110 and 122, of the external data traffic generator 106. The load generator 104 supports mapping of externally generated data traffic using either a Layer 2 (MAC)- or Layer 3 (Internet Protocol)-based capture. The addressing information within a given frame is always manipulated at a Layer 2 source or destination address depending on the directionality of movement of the frame through the load generator 104.

FIG. 2 depicts in detail the flow of Ethernet and wireless data frames through, and subsequent address translation logic within, the load generator 104. The Ethernet frames pass through address translation logic block 200 of load generator 104. The address translation logic block is an important feature of, and embodies, the principles of the present invention.

The Layer 2 source address in frames 202 arriving at the load generator's external data network interface 204 are mapped from an external source address to an emulated wireless station 208 source address using information contained in an address translation table 206 as described below.

The Layer 2 destination addresses in frames 214 arriving at the load generator's wireless network interface 210 are mapped from an emulated wireless station 208 destination address to an external destination address using address translation table 206 information.

The address translation data for a given emulated wireless station 208 are maintained in the address translation table 206. Each configured, emulated wireless station 208 has an entry in the address translation table 206. For frames 202 received over the external data network interface 204, the matching address translation table 206 entry is located by doing a table lookup using either the frame's Layer 2 (MAC) or Layer 3 (IP) source address, depending on how the emulated wireless station 208 has been configured (i.e., for Layer 2 or Layer 3 Capture). For frames 214 received over the wireless network interface 210, the matching address translation table 206 entry is located by doing a table lookup, using the frame's Layer 2 destination address.

Specifically an incoming Ethernet frame 202 is received over external data network interface 204 and passed to address translation logic block 200. An address translation table 206 coupled to the address translation logic block 200 is searched for the Layer 2 (MAC) source address 208 of the incoming frame 202. If a matching table entry is located and the entry confirms that a corresponding emulated wireless station 208: (a) is configured for Layer 2 data capture, and (b) is in a state that allows for data flow, frame 202 is prepared for transmission over a wireless medium and passed to the wireless network interface 210 for transmission as a wireless data frame.

If no matching table entry is found for the Layer 2 (MAC) source address of the incoming frame 202, the frame's header field Type-Or-Length member is decoded to see if the frame encapsulates an Internet Protocol (IP) packet. If it does, address translation table 206 is searched for the frame's Layer 3 (IP) source address. If a matching table entry for the Layer 3 address is located and the entry confirms that the corresponding emulated wireless station 208: (a) is configured for Layer 3 data capture, and (b) is in a state that allows for data flow: (1) the frame's Layer 2 (MAC) source address is stored in that address translation table entry as the external host's MAC address (this need only be done once for the first such frame), and (2) the frame's MAC source address is rewritten to use the MAC address configured for emulated wireless station 208. The frame is then prepared for transmission over the wireless medium and passed to the wireless network interface 210 for transmission as an outgoing wireless data frame 212.

An incoming wireless data frame 214 is received over the wireless network interface 210 and passed to the address translation logic block 200. Address translation table 206 is then searched for the Layer 2 (MAC) destination address of incoming wireless data frame 214.

If a matching table entry is located and the entry indicates that the corresponding emulated wireless station 208: (a) is configured for Layer 2 data capture, and (b) is in a state that allows for data flow, frame 214 is prepared for transmission over the Ethernet and passed to the external data network interface 204 for transmission to the data traffic generator 106 as an outgoing Ethernet frame 216. If no matching table entry is found for the Layer 2 (MAC) destination address of incoming wireless data frame 214, the header field Type-Or-Length member of frame 214 is decoded to see if the frame encapsulates an Internet Protocol (IP) packet. If it does, the address translation table 206 is searched for the Layer 3 (IP) destination address of frame 214. If a matching table entry is located and the entry indicates that the corresponding emulated wireless station 208 is configured for Layer 3 data capture and is in a state that allows for data flow, the Layer 2 (MAC) destination address of wireless data frame 214 is rewritten to use the external host's MAC address stored in the address translation table 206 entry for emulated wireless station 208. The wireless data frame 214 is then prepared for transmission over the Ethernet and passed to the external data network interface 204 for transmission to the data traffic generator 106 as outgoing Ethernet frame 216.

The present invention may be embodied in many forms in addition to that form disclosed herein without exceeding the scope of the present invention. As examples only, the present invention can be implemented in a totally different form factor such as a blade in a chassis, in which case the "test data stream" could be accessed via a system bus/back-plane, for example, rather than an Ethernet link (this could also include any command and control). Also, the address translation logic could be an ASIC. The present embodiment is therefore to be considered in all respects as illustrative and not restrictive, the scope of the invention being indicated by the appended claims rather than by the foregoing description. All changes which come within the meaning and range of equivalency of the claims are intended to be embraced herein.

What is claimed as the invention is:

1. A method of testing a wireless system or device, comprising:

defining a population of emulated virtual wireless stations configured to capture and forward data traffic generated by or addressed to an external data traffic generator; and performing address translation between the emulated virtual wireless stations and counterpart data streams to and from the external data traffic generator;

performing address translation to map external data traffic addressed to the virtual wireless stations;

establishing wireless communication sessions between the virtual wireless stations and a wireless system under test; and passing data frames between an external load generator and the wireless system, under test.

2. The method of claim 1 wherein the virtual wireless stations are further configured to capture data traffic at either layer 2 or layer 3 of the Open Systems Interconnection (OSI) model.

3. The method of claim 1 further comprising:

translating the address of an incoming frame originating from the external data traffic generator to the address of one of the virtual wireless stations; and transmitting the incoming frame as a wireless data frame over a wireless medium to a wireless device under test.

4. The method of claim 1 further comprising:

receiving a frame from a wireless device under test translating the virtual wireless station address of the frame received from the wireless device under test to an address recognizable by the external data traffic generator; and transmitting the received frame as an ethernet frame to the external data traffic generator.

5. The method of claim 1 further comprising:

searching an address translation table for a MAC source address of an incoming frame, the searching including locating a matching table entry in the address translation table, confirming that the emulated virtual wireless station is configured for layer 2 data, capture and is in a state that allows for data flow, preparing the incoming frame for transmission over a wireless medium, and passing the prepared incoming frame to a wireless network interface.

6. The method of claim 5 wherein the incoming frame is prepared for translation as a wireless data frame.

7. The method of claim 1 further comprising:

searching an address translation table for a MAC source address of an incoming frame, the searching including checking whether there is a matching table entry in the address translation table;

if no matching table entry is found in the address translation table examining a header field of the incoming frame for an encapsulated IP packet, if a matching IP packet is found, searching the address translation table for an IP destination address of the incoming frame if a matching table entry is found in the address translation table and the matching table entry indicates that the corresponding emulated virtual wireless station is configured for layer 3 data capture and is in a state that allows for data flow, rewriting a MAC destination address of the incoming frame to an external host's MAC address for the emulated virtual wireless station, preparing the incoming frame for transmission, and passing the incoming frame to the external data network interface for transmission.

8. A system comprising:

a data traffic generator configured to generate frames for transmission over an ethernet link and receive data frames transmitted to it over the ethernet link;

a load generator including a collection of emulated wireless stations, each wireless station configured to prepare data for transmission to a wireless device over a wireless medium; and an address translator configured to translate a source address of an ethernet frame originated by the data traffic generator to the address of one of the emulated wireless stations; and translate a destination address of a wireless data frame addressed to a virtual wireless station corresponding to a data stream originated by the data traffic generator to the address established for use by the data stream.

9. The system of claim 8 wherein:

each emulated wireless station is further configured to receive wireless data frames from the wireless device; and the address translator is further configured to translate a first address of the wireless data frame received from the wireless device to a second address of the load generator.

10. The system of claim 8 wherein the load generator further includes an address translation table to store the addresses of the emulated wireless stations.

* * * * *